US009284905B2

(12) United States Patent
Jung

(10) Patent No.: US 9,284,905 B2
(45) Date of Patent: Mar. 15, 2016

(54) CLASSIFICATION METHOD FOR AN INJECTOR, CALIBRATION METHOD FOR A CHARACTERISTIC MAP OF AN INJECTOR, AND TEST BENCH DEVICE FOR AN INJECTOR

(75) Inventor: Uwe Jung, Wörth a. d. Donau (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 944 days.

(21) Appl. No.: 13/512,698

(22) PCT Filed: Nov. 24, 2010

(86) PCT No.: PCT/EP2010/068116

§ 371 (c)(1),
(2), (4) Date: May 30, 2012

(87) PCT Pub. No.: WO2011/064248

PCT Pub. Date: Jun. 3, 2011

(65) Prior Publication Data

US 2012/0234298 A1 Sep. 20, 2012

(30) Foreign Application Priority Data

Nov. 30, 2009 (DE) ......................... 10 2009 056 289

(51) Int. Cl.
*G01M 15/04* (2006.01)
*F02M 65/00* (2006.01)
(Continued)

(52) U.S. Cl.
CPC ........ *F02D 41/2467* (2013.01); *F02D 41/2432* (2013.01); *F02M 65/001* (2013.01); *F02D 41/2096* (2013.01); *F02D 41/2435* (2013.01); *F02D 41/40* (2013.01)

(58) Field of Classification Search
CPC ...... G01M 15/04; F02M 65/00; F02M 65/001
USPC ................ 73/114.45, 114.46, 114.47, 114.48
See application file for complete search history.

(56) References Cited

U.S. PATENT DOCUMENTS 5,226,311 A * 7/1993 Scourtes .................... 73/114.42
6,561,164 B1 5/2003 Mollin .......................... 123/446
(Continued)

FOREIGN PATENT DOCUMENTS

DE 10115924 A1 10/2002 ............ F02M 65/00
DE 10215610 A1 10/2002 ............. F02D 41/24
(Continued)

OTHER PUBLICATIONS

German Office Action for Application No. 10 2009 056 289.3-13 (5 pages), Jul. 20, 2010.
(Continued)

*Primary Examiner* — Eric S McCall
(74) *Attorney, Agent, or Firm* — Slayden Grubert Beard PLLC

(57) ABSTRACT

A classification method for an injector may include: actuating the injector by means of a predefinable test control signal, detecting a quantity of liquid dispensed by the injector on the basis of the test control signal, classifying the injector as a function of the detected dispensed quantity of liquid, and determining a required control signal on the basis of the classification of the injector considering a reduced injector stroke. A calibration method for a characteristic map of an injector, and a test bench device for performing the injector classification method are also provided.

12 Claims, 3 Drawing Sheets

(51) Int. Cl.

| | |
|---|---|
| ***F02D 41/24*** | (2006.01) |
| *F02D 41/20* | (2006.01) |
| *F02D 41/40* | (2006.01) |

(56) References Cited

U.S. PATENT DOCUMENTS

| | | | | |
|---|---|---|---|---|
| 6,651,629 | B2 * | 11/2003 | McCoy et al. | 123/480 |
| 6,904,354 | B2 | 6/2005 | Kuegel et al. | 701/104 |
| 2001/0054414 | A1 | 12/2001 | Ricco | 123/490 |
| 2003/0079723 | A1 * | 5/2003 | Mollin | F02D 41/2432<br>123/446 |
| 2003/0200957 | A1 * | 10/2003 | Shinogle | 123/480 |
| 2005/0034514 | A1 * | 2/2005 | Shen | 73/119 A |
| 2005/0051147 | A1 * | 3/2005 | Nagaishi et al. | 123/676 |
| 2010/0116911 | A1 | 5/2010 | Fritsch et al. | 239/580 |

FOREIGN PATENT DOCUMENTS

| | | | | |
|---|---|---|---|---|
| DE | 10236820 | A1 | 2/2004 | F02D 41/20 |
| DE | 102007018627 | A1 | 10/2008 | F02D 41/30 |
| DE | 102007019099 | A1 | 10/2008 | F02D 41/20 |
| DE | 102009056289 | A1 | 7/2011 | F02M 65/00 |
| WO | 03/038265 | A1 | 5/2003 | F02D 35/00 |
| WO | 2011/064248 | A1 | 6/2011 | F02D 41/24 |

OTHER PUBLICATIONS

International Search Report and Written Opinion for Application No. PCT/EP2010/068116 (20 pages) Apr. 4, 2011.

* cited by examiner

CLASSIFICATION METHOD FOR AN INJECTOR, CALIBRATION METHOD FOR A CHARACTERISTIC MAP OF AN INJECTOR, AND TEST BENCH DEVICE FOR AN INJECTOR

CROSS-REFERENCE TO RELATED APPLICATIONS

This application is a U.S. National Stage Application of International Application No. PCT/EP2010/068116 filed Nov. 24, 2010, which designates the United States of America, and claims priority to German Application No. 10 2009 056 289.3 filed Nov. 30, 2009, the contents of which are hereby incorporated by reference in their entirety.

TECHNICAL FIELD

The present disclosure relates to a classification method for an injector, a calibration method of a characteristic diagram of an injector and a test bench device of an injector, with which test bench device the classification method disclosed herein can be carried out.

BACKGROUND

Injectors for an injection system of an internal combustion engine, for example for a common rail injection system, are divided into various classes after their manufacture. This is usually done on the basis of a quantity deviation between a setpoint quantity of fluid and a quantity of fluid of the injector which is actually output.

In the case of conventional classification, the injector is actuated with a test control signal. The injector outputs a quantity of fluid on the basis of the test control signal. In order to permit comparisons to be made between the individual injectors, identical conditions must be present in all cases during an injector test. For this purpose, the test control signal is, in particular, a signal with in each case the same voltage, the same current strength and the same duration.

Furthermore, the injectors are each subject to the same pressure conditions as an ideal injector which serves as a reference.

The quantity of fluid which is output by the injector can be differentiated from a setpoint quantity of fluid, associated with the test control signal, of an ideal injector or reference injector. On the basis of the quantity of fluid which is output, the injector is classified and a necessary control signal is determined. In particular, each class is assigned a correction value for a duration of the control signal. This means, for example, that an injector which outputs a smaller quantity of fluid than the setpoint quantity of fluid is actuated with a control signal which is longer than the test control signal. A precondition for this is that in each case identical environmental conditions are present, as has already been stated above. In the case of an injector which outputs a larger quantity of fluid than the setpoint quantity of fluid, the behavior is actually inverted. This injector is actuated later with a control signal which is shorter in comparison with the test control signal.

In the text which follows, in particular injectors are considered which output a quantity of fluid which is larger in comparison with a setpoint quantity of fluid. If such an injector was classified with the method described above, overcompensation may occur, as a result of which in a later operating mode in an internal combustion engine the injector outputs too little or even no fluid in comparison with a setpoint quantity of fluid. As a result, a difference in quantities occurs between the setpoint quantity of fluid and the quantity of fluid which is output. During use of the injector in an internal combustion engine this may give rise to a disadvantageous combustion behavior of the internal combustion engine.

Hitherto, the above-mentioned disadvantage has not been corrected directly. Changes in the quantity of fluid which is output by an injector have hitherto been merely corrected by running time adaptation methods such as, for example, the MFMA (Minimal Fuel Mass Adaptation) method as a function of a running time of the internal combustion engine. With these methods, an initial conspicuous injection behavior of such an injector may therefore occur.

Furthermore, in particular in the contemporary Euro5 and in the future Euro6 applications, relatively small injection quantities with tighter tolerances will be required compared to Euro4 applications. This will lead to a situation in which an ever higher number of injectors will have to be removed from production at the end testing unless there is a change in the classification method described above.

SUMMARY

In one embodiment, a classification method for an injector comprises (a) actuating the injector with a predefinable test control signal, (b) detecting a quantity of fluid which is output by the injector on the basis of the test control signal, (c) classifying the injector on the basis of the quantity of fluid which is output, and (d) determining a necessary control signal on the basis of the classification of the injector taking into account a reduced injector stroke.

In a further embodiment, on the basis of the test control signal the injector outputs a quantity of fluid which is larger than a setpoint quantity of fluid which is associated with the test control signal. In a further embodiment, the reduced injector stroke is taken into account by adapting a current level of the necessary control signal or by adapting a duration of the necessary control signal.

In a further embodiment, the method further comprises (e) comparing the detected quantity of fluid which is output with the setpoint quantity of fluid which is associated with the test control signal, and (f) determining a quantity class of the injector on the basis of the comparison. In a further embodiment, the method further comprises (g) determining an offset time of the injector on the basis of the determined quantity class. In a further embodiment, the method further comprises (h) forming a difference between a test actuation duration which is associated with the test control signal and the determined offset time of the injector. In a further embodiment, the reduced injector stroke is taken into account by adding a correction time to the difference which is formed. In a further embodiment, the necessary control signal is a necessary actuation duration. In a further embodiment, the method further comprises (i) storing the necessary control signal in a control unit of an internal combustion engine.

In a further embodiment, the injector is provided for use in a common rail injection system. In a further embodiment, the injector is a piezo injector or a solenoid injector.

In another embodiment, a calibration method of a characteristic diagram of an injector has the following steps: (a) providing a standard characteristic diagram of the injector, (b) checking the classification of the injector by means of the classification method as discussed above, and (c) calibrating the standard characteristic diagram of the injector on the basis of the checking of the classification.

In a further embodiment, the standard characteristic diagram was selected on the basis of a quantity classification of the injector.

In another embodiment, a test bench device of an injector is provided for carrying out any of the classification methods discussed above, and which test bench may include (a) a securing device for the injector, (b) an electronic actuation system with which the injector can be actuated with a test control signal, while (c) the injector can be classified with the test bench device taking into account a reduced injector stroke.

BRIEF DESCRIPTION OF THE DRAWINGS

Example embodiments will be explained in more detail below with reference to figures, in which.

DETAILED DESCRIPTION

Figure 1:
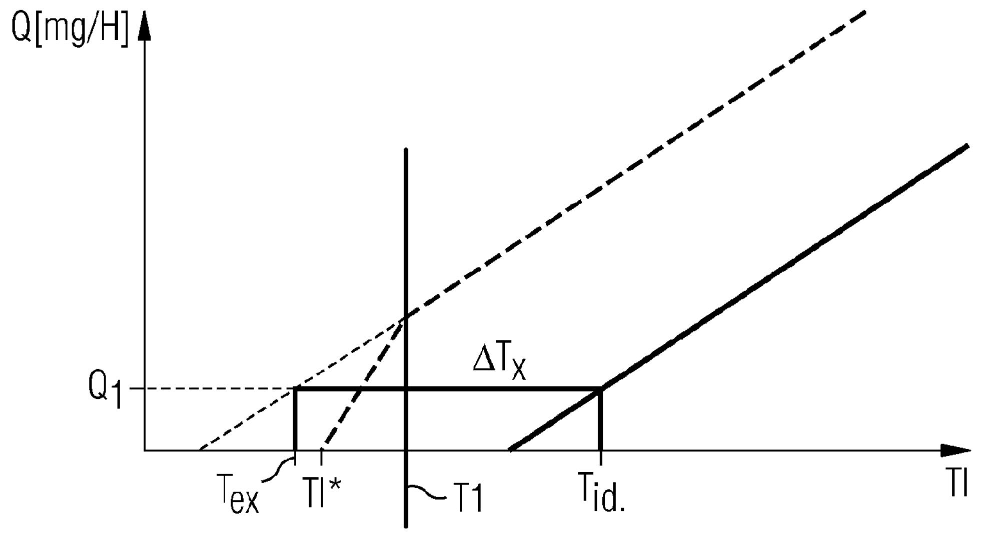
FIG. 1 shows a schematic illustration of a characteristic curve profile of an ideal injector and of an example injector.

Some embodiments provide methods and devices configured to optimize a classification method in comparison with conventional methods and devices.

In some embodiments, a classification method for an injector has the following steps: actuating the injector with a predefinable test control signal, detecting a quantity of fluid which is output by the injector on the basis of the test control signal, classifying the injector on the basis of the quantity of fluid which is output and determining a necessary control signal on the basis of the classification of the injector taking into account a reduced injector stroke.

The injector is actuated with the predefinable test control signal. This test control signal is a signal with in each case the same current strength, same voltage and same duration, as already described at the beginning. Furthermore, identical pressure conditions are present at the injectors, as is also stated above. The injector is provided, in particular, for use in a common rail injection system of a diesel internal combustion engine. Furthermore, the injector may be a piezo injector or a solenoid injector.

The injector outputs a quantity of fluid on the basis of the test control signal. The fluid which is output may be, for example, diesel fuel, another fuel of an internal combustion engine or a fluid with fuel-like properties in respect of viscosity and density.

The quantity of fluid which is output is detected and the injector is classified on the basis of the quantity of fluid which is output, for example on the basis of a standard characteristic diagram. In particular, the classification can be used to determine an offset time by which a duration of the control signal has to be reduced in comparison with a duration of the test control signal.

The control signal which is necessary for the injector is determined on the basis of the classification of the injector taking into account a reduced injector stroke. In particular, the required control signal is a required actuation duration. The required control signal may be stored in a control unit of an internal combustion engine. When used in an internal combustion engine, the injector can therefore be actuated directly with a suitable control signal. The reduced injector stroke is taken into account, for example, by adapting a current level of the necessary control signal or by adapting a duration of the necessary control signal.

If, for example, the duration of the control signal which is determined by means of the standard characteristic diagram undershoots a predeterminable limiting value, a reduction in the injector stroke may occur due to the excessively short duration of the control signal. In other words, the injector may not completely open. The predeterminable limiting value is therefore, in particular, the time at which the injector stroke is no longer reduced. The reduced injector stroke may be taken into account when the predeterminable limiting value is undershot by, for example, adapting a characteristic curve.

A possible advantage of this classification is that in this way it is possible to avoid overcompensation. The classification and the injection behavior of the injector fit together. For this reason, during later operation of the injector an excessively small quantity of fluid is not output. As a result, an initial, conspicuous injection behavior of the injector, which can only be compensated, for example, by means of running time adaptation methods, has to be accepted.

The classification method may be advantageously used, e.g., in an injector which, on the basis of the test control signal, outputs a quantity of fluid which is larger than a setpoint quantity of fluid which is associated with the test control signal. In this way, fewer injectors have to be removed during production of the injectors in comparison with the previous method.

In one embodiment, the classification method has the further step of comparing the detected quantity of fluid which is output with the setpoint quantity of fluid which is associated with the test control signal, and determining a quantity class of the injector on the basis of the comparison. On the basis of these steps, a correction value can be determined from a standard characteristic diagram. In particular, an offset time of the injector may be determined on the basis of the determined quantity class.

This may be advantageous, e.g., in the case of injectors which are corrected by changing a duration of the control signal. This offset time may be determined, for example, from a standard characteristic diagram of an injector on the basis of the determined quantity class.

In a further embodiment, the classification method has the further step of forming a difference between a test actuation duration which is associated with the test control signal and the determined offset time of the injector. A result of the difference which is formed may be compared, for example, with the predeterminable limiting value. If the predeterminable limiting value is undershot, a reduced injector stroke has to be taken into account. The reduced injector stroke may be taken into account, for example, by adding a correction time to the difference which is formed.

In some embodiments, a calibration method of a characteristic diagram of an injector comprises the following steps: providing a standard characteristic diagram of the injector, checking the classification of the injector by means of the classification method disclosed herein, and calibrating the standard characteristic diagram of the injector on the basis of the checking of the classification.

At first, the standard characteristic diagram of the injector is provided. The classification of the injector on the basis of the standard characteristic diagram is checked by means of the classification method described above. A change in the classification based on the disclosed classification method leads, for example, to a change in a control signal. Taking this as a basis, the standard characteristic diagram of the injector is calibrated on the basis of the checking of the classification. A necessary control signal is therefore stored in the calibrated characteristic diagram. The standard characteristic diagram in the calibration method is selected, in particular, on the basis of a quantity classification of the injector.

In some embodiments, a test bench device of an injector with which any of classification methods disclosed herein can be carried out has the following features: a securing device for the injector and an electronic actuation system with which the injector can be actuated with a test control signal, while the injector can be classified with the test bench device taking into account a reduced injector stroke.

The classification method described above can be carried out by the test bench device. The injector which was tested in this test bench device accordingly may have any or all of the advantages discussed above when used in an internal combustion engine and the corresponding characteristic diagram is stored in a control unit of the internal combustion engine.

The injector may be, for example, an injector which is provided for later use in a common rail injection system of a diesel internal combustion engine. The injector may be mounted and tested in a test bench device. The injector may be actuated with a test control signal by means of an electronic actuation system of the test bench device. Furthermore, a quantity of fluid which is output by the injector on the basis of the test control signal can be detected with the test bench device. Further test conditions such as, for example a pressure of the fluid present at the injector are the same for the respective injectors to be tested.

The injector outputs a quantity of fluid on the basis of the actuation of the injector with the test control signal. Said quantity of fluid may differ from a setpoint quantity of fluid associated with the test control signal. In the text which follows, in particular injectors with a quantity of output fluid which is too large in comparison with the setpoint quantity of fluid are considered.

Referring to FIG. 1, a characteristic curve profile of an ideal injector and of an example injector are illustrated. A quantity Q of fluid is plotted in mg per stroke (mg/H) on the axis, and a duration of a control signal TI is plotted on the X axis. The characteristic curve of the ideal injector is illustrated by continuous lines, while the characteristic curve of the exemplary injector which is provided according to a conventional method is represented by a straight dashed line. This straight dashed characteristic curve is usually determined by means of extrapolation and corresponds in its gradient to the characteristic curve of the ideal injector. Furthermore, FIG. 1 illustrates an actual initial characteristic curve profile of the exemplary injector starting from a time TI*. The time T1 corresponds to the time at which there is no longer a reduced stroke of the injector.

The injection time which is necessary for a necessary quantity $Q_1$ of fluid corresponds to the injection time $T_{id}$ in the case of an ideal injector. However, according to the extrapolated characteristic curve a reduced injection time $T_{ex}$ is necessary for an injector which is present by way of example. The injection time $T_{ex}$ which is determined in a conventional method is used later for the exemplary injector during actuation. It is apparent from FIG. 1 that a minimum necessary control signal duration starts at TI* for the exemplary injector. This means therefore that when the injector is actuated with a control signal duration of less than TI* no fluid is output by the injector. The difference between the extrapolated characteristic curve and the actual characteristic curve of the injector is caused by an initially reduced stroke of the injector. This reduced stroke is not taken into account in the extrapolated characteristic curve.

Figure 2:
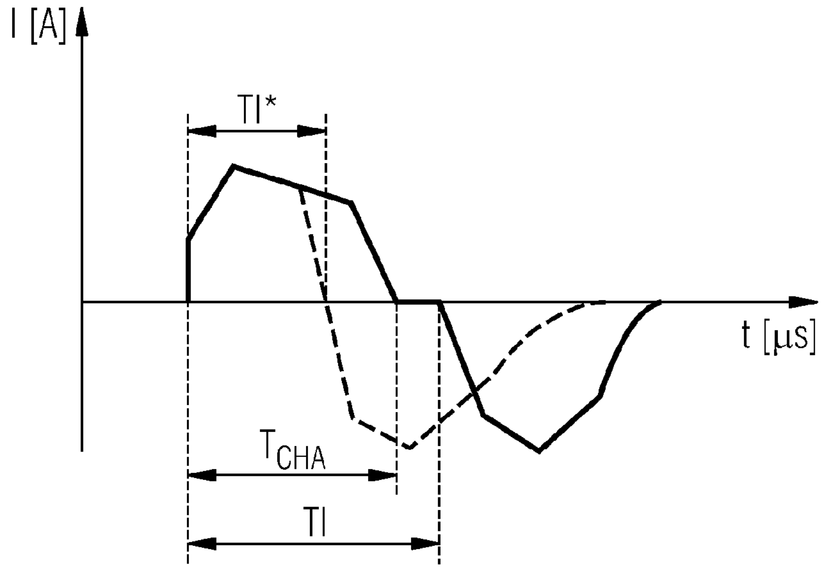
FIG. 2 shows a schematic illustration of a characteristic curve profile of an ideal injector and of an example piezo injector.

Referring to FIG. 2, a schematic illustration of a characteristic curve profile of an ideal injector and of an example piezo injector is illustrated. The characteristic curve profile of the ideal injector is illustrated by the unbroken line and that of the exemplary piezo injector is illustrated by the dashed line. The time t is plotted on the X axis, and the current is plotted on the Y axis. The time denoted by T1 in FIG. 1, at which a complete stroke of the injector occurs, is denoted by a time duration $T_{CHA}$ in FIG. 2. From FIG. 2 it is apparent that a charging time of the exemplary piezo injector is shortened in comparison with the ideal injector. The charging time of the ideal injector corresponds to the range denoted by $T_{CHA}$, that is to say the range in which the continuous curve profile runs above the X axis. As stated above, this can lead to a situation in which later the injector does not output any quantity of fluid, or outputs an excessively small quantity of fluid, in comparison with a setpoint quantity of fluid.

Figure 3:
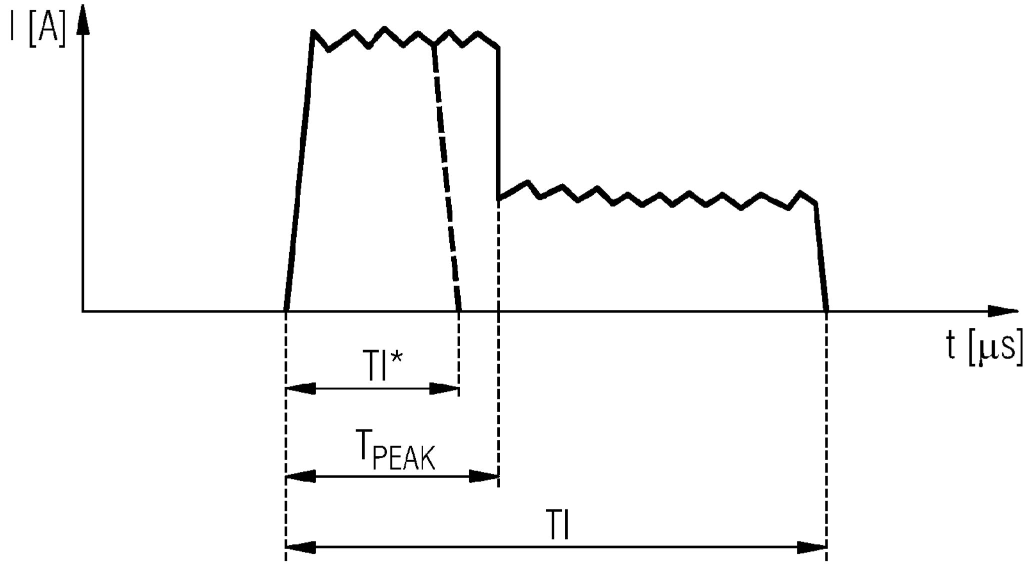
FIG. 3 shows a schematic illustration of a characteristic curve profile of an ideal injector and of an example solenoid injector.

FIG. 3 illustrates a schematic illustration of a characteristic curve profile of an ideal injector and of an exemplary solenoid injector. The characteristic curve profile of the ideal injector is illustrated by the continuous line and that of the exemplary solenoid injector is illustrated by the dashed line. In a way analogous to FIG. 2, the time t is plotted on the X axis and the current is plotted on the Y axis. The time denoted by T1 in FIG. 1, at which a complete stroke of the injector is present, is denoted by a time duration $T_{PEAK}$ in FIG. 3. From FIG. 3 it is apparent that a peak phase of the exemplary solenoid injector is shortened in comparison with the ideal injector. The peak phase of the ideal injector corresponds to the range denoted by $T_{PEAK}$. The result of a shortened peak phase is analogous to the result of shortening of the charging time described above in the exemplary piezo injector.

The classification method of the present disclosure is explained below with reference to FIGS. 4 and 5. In a step A the injector is actuated with the test control signal, for example for a test actuation duration. In a step B a quantity of fluid which is output by the injector on the basis of the test control signal is detected by the test bench device. The injector is classified (step C) on the basis of the quantity of fluid which is output. For example, for this purpose the detected quantity of fluid which is output is first compared with the setpoint quantity of fluid which is associated with the test control signal (step E). On the basis of the comparison, a quantity class of the injector is determined in a step F, for example, from a standard characteristic diagram of the injector. An offset time $\Delta T_x$ of the injector can be determined in a step G by the quantity class from the standard characteristic diagram. In step H a difference is formed between the test actuation duration and the offset time $\Delta T_x$.

In step D a necessary control signal is determined on the basis of the classification of the injector taking into account a reduced injector stroke. The necessary control signal is, in particular, a necessary actuation duration.

Figure 4:
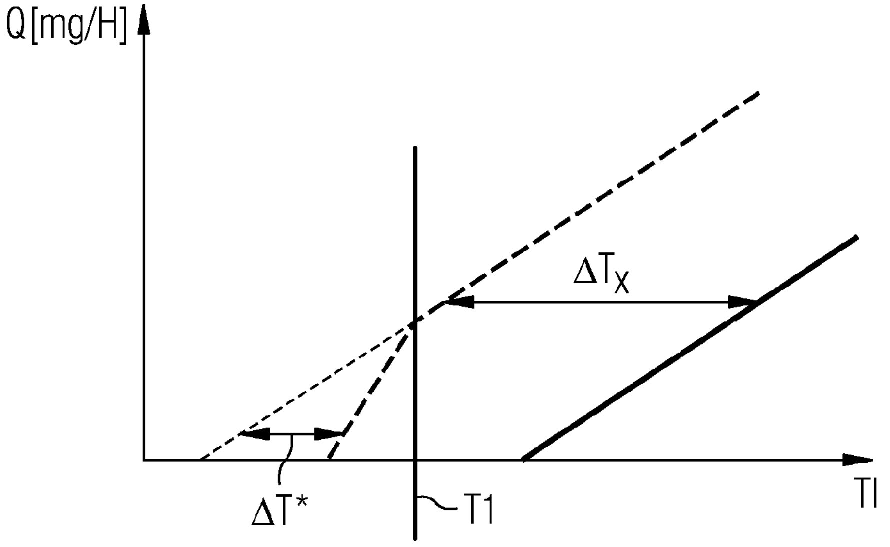
FIG. 4 shows a schematic illustration of a characteristic curve profile of an ideal injector and of an example injector to which the classification method disclosed herein has been applied.
Figure 5:
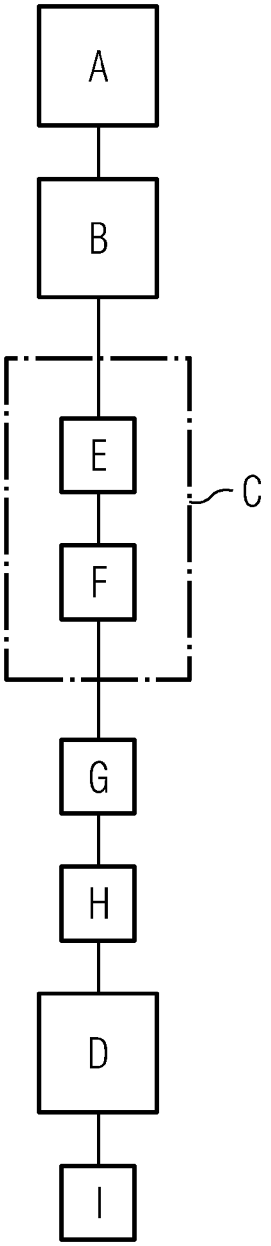
FIG. 5 shows a schematic illustration of a method sequence of the classification method according to an example embodiment.

The determination process can be carried out, for example, by firstly checking whether the difference formed in step H is below a predeterminable limiting value T1 (FIG. 4). This limiting value corresponds, in particular, to the time which an injector requires to carry out a complete stroke. If this limiting value is undershot, a correction time ΔT* is added to the difference which is formed. The correction time ΔT* is a function of the gradient difference of an actual characteristic curve with respect to an extrapolated characteristic curve of the injector.

Referring to FIG. 2, the reduced injector stroke can also be taken into account by adapting the current I. To do this, the current must be raised when the limiting value T1 or the time duration $T_{CHA}$ is undershot, said current being raised in such a way that the integral of the current of the piezo injector in the region TI* corresponds to the integral of the current in the region $T_{CHA}$ of the ideal injector. In the case of a piezo injector this may be implemented by increasing the charge energy.

In step I the necessary control signal is then stored in a control unit of an internal combustion engine.

Figure 6:
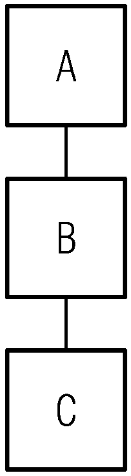
FIG. 6 shows a schematic illustration of a method sequence of the calibration method according to an example embodiment.

Referring to FIG. 6, a calibration method of a characteristic diagram of an injector is schematically illustrated. Here, in step A a standard characteristic diagram of the injector is provided. In step B the classification of the injector is checked by means of the classification method discussed herein. On the basis of the checking process, calibration of the standard characteristic diagram of the injector then takes place in step C. In particular, the standard characteristic diagram was selected on the basis of a quantity classification of the injector.

What is claimed is:

1. A classification method for an injector, the method comprising:

actuating the injector with a test control signal having a current level and a duration, detecting a quantity of fluid output by the injector based on the test control signal, comparing the detected quantity of fluid output by the injector with a quantity of fluid associated with the test control signal, classifying the injector based on the quantity of fluid output by the injector by determining a quantity class of the injector based on the comparison, determining a necessary control signal to yield a desired fluid output based on the classification of the injector, determining an offset time of the injector based on the determined quantity class, and accounting for any injector with a reduced stroke by adjusting the current level or the duration of the test control signal to determine the necessary control signal to yield a desired fluid output.

2. The classification method of claim 1, wherein based on the test control signal, the injector outputs a quantity of fluid which is larger than a quantity of fluid associated with the test control signal.

3. The classification method of claim 1, further comprising storing the necessary control signal in a control unit.

4. The classification method of claim 1, wherein the injector is configured for use in a common rail injection system.

5. The classification method of claim 1, wherein the injector is a piezo injector or a solenoid injector.

6. The classification method of in claim 1, wherein the step of determining the necessary control signal comprises forming a difference between a test actuation duration associated with the test control signal and the determined offset time of the injector.

7. The classification method of claim 6, wherein the reduced injector stroke is taken into account by adding a correction time to the difference which is formed.

8. The classification method of claim 6, wherein the necessary control signal comprises an actuation duration different from that of the test signal.

9. A calibration method of a characteristic diagram of an injector, comprising:

providing a standard characteristic diagram of the injector, classifying the injector by a process comprising:

actuating the injector with a predefinable test control signal, detecting a quantity of fluid output by the injector based on the test control signal, and classifying the injector based on the quantity of fluid output by the injector, and calibrating the standard characteristic diagram of the injector based on the classification.

10. The calibration method of claim 9, wherein the standard characteristic diagram was selected based on a quantity classification of the injector.

11. A test bench device of an injector, comprising:

a securing device for the injector, and an electronic actuation system to actuate the injector with a test control signal with a quantity of fluid associated therewith, wherein the test bench device is configured to classify the injector by:

actuating the injector with the test control signal, detecting a quantity of fluid output by the injector based on the test control signal, comparing the detected quantity of fluid output by the injector with a quantity of fluid associated with the test control signal, classifying the injector based on the quantity of fluid output by the injector by determining a quantity class of the injector based on the comparison, determining an offset time of the injector based on the determined quantity class, determining a necessary control signal to obtain a desired fluid output based on the quantity classification of the injector, and accounting for any injector with a reduced stroke by adjusting the current level or the duration of the test control signal to determine the necessary control signal to yield a desired fluid output.

12. A classification method for an injector to determine an appropriate control signal to obtain a desired fluid output by the injector, the method comprising:

actuating the injector with a test control signal having a duration and a quantity of fluid associated therewith, detecting a quantity of fluid output by the injector that differs from the quantity of fluid associated with the test control signal, comparing the detected quantity of fluid output by the injector with the quantity of fluid associated with the test control signal, classifying the injector based on the comparison, determining an offset time of the injector based on the classification, determining the appropriate control signal to obtain a desired fluid output based on the classification of the injector, wherein the appropriate control signal comprises a signal having a duration different from that of the test control signal, and accounting for any injector with a reduced stroke by adjusting the current level or the duration of the test control signal to determine the necessary control signal to yield a desired fluid output.

* * * * *